F. DIESCHER.
Guard for Bedstead.
No. 208,721. Patented Oct. 8, 1878.
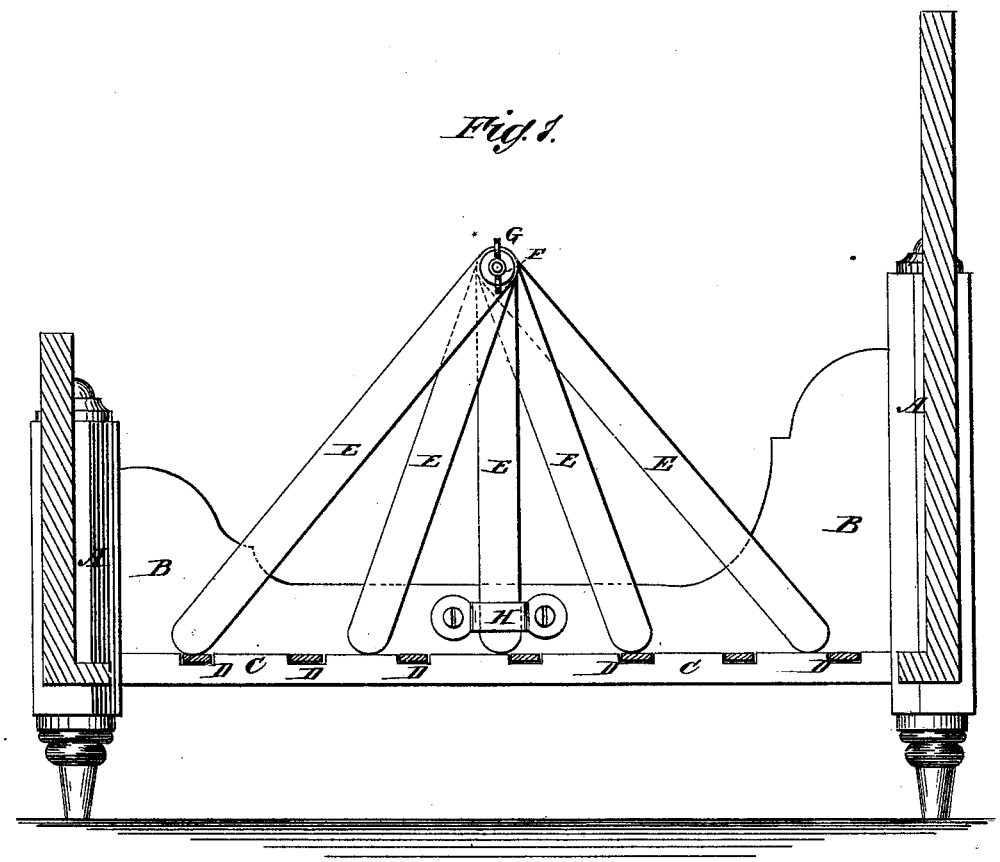
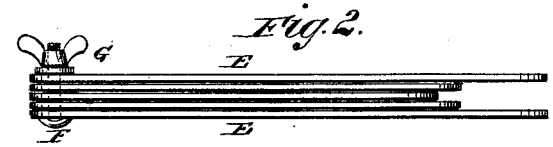
WITNESSES:
INVENTOR:
F. Diescher
BY
ATTORNEYS.

UNITED STATES PATENT OFFICE.

FERDINAND DIESCHER, OF NEW YORK, N. Y.

IMPROVEMENT IN GUARDS FOR BEDSTEADS.

Specification forming part of Letters Patent No. 208,721, dated October 8, 1878; application filed August 28, 1878.

*To all whom it may concern:*

Be it known that I, FERDINAND DIESCHER, of New York city, in the county and State of New York, have invented a new Improvement in Guard Attachment for Bedsteads, of which the following is a specification:

Figure 1 is a side view of my improved device, shown as arranged for use upon a bedstead, the bedstead being shown in longitudinal section. Fig. 2 represents the device as folded together for storage.

Similar letters of reference indicate corresponding parts.

The object of this invention is to furnish an improved device for attachment to a bedstead to prevent children from falling out of bed, which shall be simple in construction and convenient and reliable in use, and which, when not in use, may be folded into compact form, so as to occupy but little space.

The invention consists in the combination of the strips, the bolt and hand-nut, and the keeper with each other, to adapt the device to be applied to a bedstead, as hereinafter fully described.

A represents the end boards, and B the side boards, of a bedstead. C are cleats or strips, which are attached to the side boards B, to receive the ends of the slats D, in the ordinary way. E are strips, three, five, or seven of which may be used, and which are pivoted to each other at one end by a bolt, F, and hand-nut G. One of the strips E, preferably the central one, is made the shortest, and the others increase in length by pairs, the strips of each pair being of the same length. To the middle part of the inner side of the side board B is attached a keeper, H, to receive the free end of the shortest strip E. The other strips are spread out in fan-shape, so that their free ends may rest upon the cleat or strip C, as shown in Fig. 1, where they are secured in place by tightening the nut G, and are further secured in place by the mattress, which rests against their inner sides. By the use of this device children will be effectually prevented from falling out of bed.

When the device is not in use, the nut G may be loosened, the strips E folded together, as shown in Fig. 2, and the said nut again tightened, and the device may be laid at the foot of the bed, or in any other convenient place.

I am aware that it is not new to attach an adjustable frame to the side of a lounge, or to use with a mosquito-net a series of pivoted arms held in different positions by adjusting-arms and clamp-screws; but

What I claim is—

The strips E, having all their upper ends held together on a pivot-bolt, F, and the lower end of middle one in a keeper, H, in combination with bedstead A B C D, as shown and described.

FERDINAND DIESCHER.

Witnesses:
JAMES T. GRAHAM,
C. SEDGWICK.